July 6, 1954  M. A. RUFFOLO  2,682,852

MARINE ENGINE COOLING DEVICE

Filed May 22, 1952

INVENTOR
MARIO A. RUFFOLO

BY  A. Winburn

ATTORNEY

Patented July 6, 1954

2,682,852

UNITED STATES PATENT OFFICE 2,682,852

MARINE ENGINE COOLING DEVICE

Mario A. Ruffolo, Bronx, N. Y.

Application May 22, 1952, Serial No. 289,313

1 Claim. (Cl. 115—0.5)

This invention relates to improvements in cooling marine power plants.

An object of the invention is to provide improved means for using the cool water in which the vessel is afloat for cooling the vessel engine.

Another object of the invention is to provide a novel and improved cooling means for a marine power plant employing a liquid water jacket, and novel means for bringing the circulating cooling fluid into close substantially heat transfer contact with the ambient sea waters, the construction being such that a very high efficiency of heat transfer from the cooling fluid of the engine to the sea waters is achieved, thus improving the efficiency of the engine, and the reducing of rusting and deterioration to a minimum.

A further object of the invention is to provide a novel and improved heat transfer device which may be attached to any type of marine power plant for increasing the cooling powers of the water jacket of the engine, and including at least one elongated tubular housing of substantial diameter and arranged so that ambient water not only flows through the same, but also around the entire outer surface thereof, and is thus brought into close cooling engagement with a very thin cross-sectional water jacket through which the hot circulating fluid from the engine water jacket flows, and which is thus effectively cooled and returned to the engine.

Still another object of the invention is to provide a novel and improved auxiliary cooling device of the character described, which may be attached to the hull of a vessel without impairing the essential streamlining thereof or materially reducing the speed capabilities of the vessel.

Still a further object of the invention is to provide a novel and improved auxiliary cooling device of the character described, which is simple in design, inexpensive to manufacture, and highly effective in use.

These and other objects and advantages of the invention will become apparent from the following description of a preferred embodiment thereof, as illustrated in the accompanying drawings, forming a part hereof, and in which, Fig. 1 is a side elevational view showing a marine vessel carrying an auxiliary cooling device constructed according to the invention for cooling its engine;

Fig. 5 is an enlarged cross-sectional view taken substantially on line 5—5 of Figure 2.

In order to understand clearly the nature of the invention and the best means for carrying it out, reference may now be had to the drawings, in which like numerals denote similar parts throughout the several views.

Figure 1:
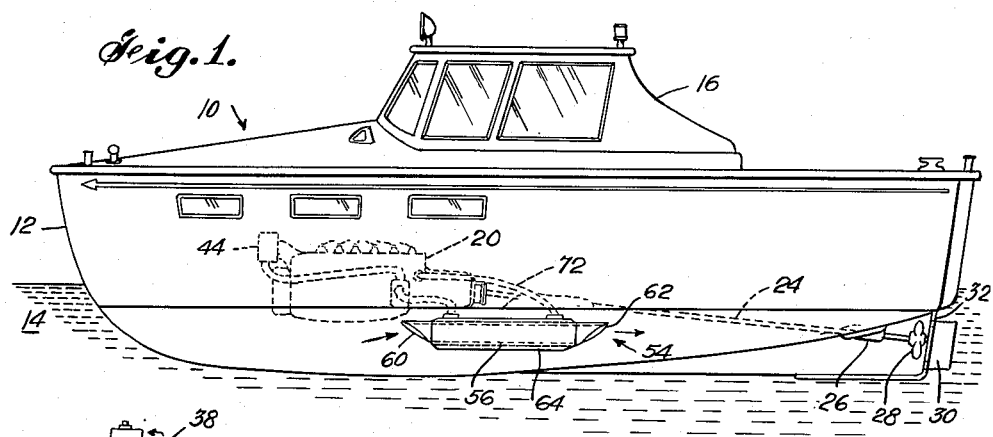
Figure 2:
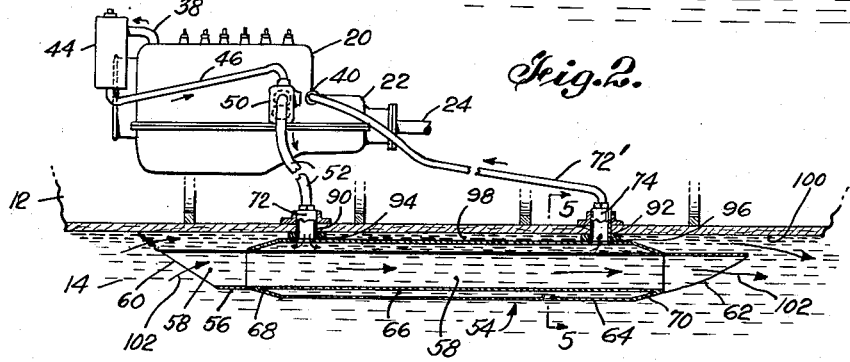
Fig. 2 is an enlarged fragmentary sectional view on a plane longitudinally of the hull of the vessel of Figure 1, showing the engine and cooling device.
Figure 3:
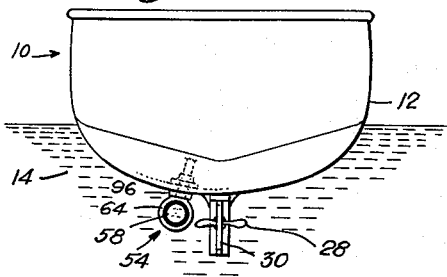
Fig. 3 is a right end elevational view of the vessel of Figure 1, showing the use of a single auxiliary cooling device of my invention.

As shown, there is a marine vessel generally indicated at 10, which may for example, be a motor driven cruiser the hull 12 of which floats in the water 14, and carries a pilot house or bridge 16 in which the pilot steers and navigates the vessel and controls the operation of the power plant. A marine engine 20 of the gasoline or diesel type is disposed inside the hull 12, in the engine room or other suitable compartment, and is coupled through any suitable transmission gearing and clutch in the housing 22, to the drive shaft 24 which in turn extends rearwardly through a bearing 26 to the propeller 28 mounted thereon for rotation therewith. A rudder 30 is mounted on a vertical rudder shaft 32 for turning therewith about a vertical axis under the control of the pilot, for controlling the direction of motion of the vessel as it is propelled by the screw 28 forwardly or in reverse.

The gasoline or diesel engine 20 has the customary water jacket (not shown) with an outlet duct connected at 38 and an inlet at 40, the hot water in the jacket being thus caused to flow upwards out of the engine at 38 and thence back to the cooling water jacket inlet 40. I connect an expansion tank 44 to the duct 38, and another duct 46 to the other end of the expansion tank. A coolant circulating pump 50 of any suitable type, driven by the engine 20, is supported near the engine, the duct 46 being connected to one side of the water pump 50, and the duct 52 to the other side of the water pump.

A cooling housing 54 is disposed on the outside of the hull 12, and immersed in the ambient sea or river or lake water 14 in which the vessel is floating. The cooling housing 54 includes a main ambient water casing 56, which is tubular and may be cylindrical or otherwise in shape as shown defining a tubular water passage or bore 58 of substantial length and inside diameter, with its inlet 60 cut off obliquely rather than perpendicular to its axis, to aid in throwing off any objects which might tend to enter the main cooling duct 58 as the vessel moves forwardly. Similarly the rearward end 62 of the main cooling duct 58 is also obliquely cut off as shown and for the same purpose. An outer tubular housing 64, which is almost as long as the cooling housing 54 but greater in inside diameter than the outside diameter of the housing 54, is disposed coaxially and concentrically of the inner housing 54 and thus spaced therefrom slightly, to define a cooling jacket annular chamber 66 around the outside of the cooling housing 54. The outer cylindrical housing 64 has its ends 68 and 70 reduced conically as shown, to merge smoothly with the outer surface of the inner cylinder 56, being secured thereto by welding, brazing, bronze-soldering, or other suitable leakproof means, to form a single assembled unit comprising the inner cylinder 56 and the jacket cylinder 64.

Bracket means for supporting the auxiliary cooling jacket includes the nipples 72 and 74 which are connected at their inner ends to the tubular connections 52 and 72', respectively, and their outer ends are inserted into openings formed in the auxiliary cooling jacket cylinder 64, as at 76 (see Fig. 5) for communicating with the interior of the jacket 66. The nipples are secured in the said openings by any suitable means, as by welding, soldering or otherwise. It is thus seen that the regular cooling water from the cooling jacket of the engine 20 may be circulated from the hot engine through the tubular connections 52 and 72', by means of the circulating pump 50, and through the annular cooling jacket chamber 66. As a result, the hot cooling fluid is brought into the auxiliary water jacket chamber 66 where its heat is quickly absorbed through the walls 56 and 64, and into the ambient waters, being thus cooled thereby.

It is noted that the nipples or pipes 72 and 74 extend through openings 90 and 92 respectively, in the hull of the vessel, with annular bushings 94 and 96 disposed around the lower portions of the nipples so as to space the outer casing 64 from the adjacent hull surface, thus defining an unoccupied area 98 between the casing 64 and the hull surface 100 for the free flow of ambient water around the same. The ambient water thus can flow freely not only in the direction of the arrow 102 through the cylindrical passageway 58, but also all around the outer surface of the outer cylinder 64, and in the direction of the arrow 104 between the cylinder 64 and the hull of the vessel. As a result, there is a considerable cooling effect on the water in the auxiliary jacket chamber 66 because the inner and outer surfaces of the said chamber 66 are simultaneously cooled.

The inside diameter of the outer cylinder 64 is selected so that it is very little greater than the outside diameter of the inside cylinder 56, and as a result, the cross sectional area of the auxiliary cooling jacket chamber 66 is quite small in proportion, a thin stream of cooling water flowing therethrough, and hence capable of being cooled rapidly by the large volume of ambient sea water flowing both through the duct 58 and all around the exterior of the jacket wall 64, including the area between the hull and the jacket 64. This gives quite high heat transfer efficiency, and aids in improving the output, performance and long-life of the marine engine 20. The length and diameters of the various jackets 56 and 64 are selected depending upon the heat to be transferred from the engine 20, that is, the cooling effort needed. As an example, for a moderate sized vessel, the outer cylinder 64 may be five feet long, the outside diameter of inner tube 56 may be about 2⅝" and the inside diameter of the outer tube 64 may be about 2$\frac{13}{16}$", making the jacket space all around $\frac{3}{32}$ of an inch.

Figure 4:
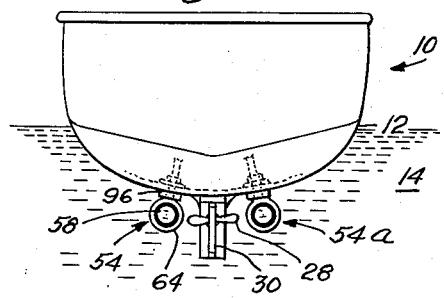
Fig. 4 is a view similar to that of Figure 3, but showing the use of two such auxiliary cooling devices.

Although I have described my invention in specific terms, it will be understood that various changes may be made in size, shape, materials and arrangement without departing from the spirit and scope of the invention. It will also be understood that more than one such outside cooling jacket means may be employed, as shown at 54 and 54a in Figure 4, on each side of the keel of the vessel, both being connected by suitable piping to the water jacket of the engine 20.

I claim:

In combination, a vessel, an engine mounted thereon, engine cooling jacket means carried externally by the hull of said vessel and disposed in ambient water, said jacket means having a first inner hollow member defining an inner passage for the ambient water therethrough, a second outer hollow member concentric with said first inner hollow member and spaced therefrom to define a cooling jacket chamber therebetween for receiving coolant from the engine, means for supporting said outer member in spaced relation to the hull of the vessel, so that ambient water is free to flow around the outside of said outer member and through the bore of said inner member for cooling the coolant in said jacket, said supporting means including conduit means extending therethrough, tubular connections extending from said engine to said conduit means, and deflector means positioned adjacent said jacket means for deflecting objects downwardly away from said jacket means.

References Cited in the file of this patent

UNITED STATES PATENTS

| Number | Name | Date |
|---|---|---|
| 714,077 | Whittelsey | Nov. 18, 1902 |
| 897,532 | Herman | Sept. 1, 1908 |
| 2,258,526 | Walter | Oct. 7, 1941 |
| 2,466,525 | Wilson | Apr. 5, 1949 |
| 2,612,858 | Mairs | Oct. 7, 1952 |

FOREIGN PATENTS

| Number | Country | Date |
|---|---|---|
| 107,466 | Great Britain | July 17, 1917 |
| 262,414 | Great Britain | Feb. 17, 1927 |